United States Patent
Inoue et al.

(10) Patent No.: US 8,141,415 B2
(45) Date of Patent: Mar. 27, 2012

(54) TIRE TESTING DEVICE

(75) Inventors: Isamu Inoue, Kanagawa (JP); Isao Nakamura, Kanagawa (JP); Hideki Oikawa, Kanagawa (JP); Hiroko Maniwa, Kanagawa (JP)

(73) Assignee: Ono Sokki Co., Ltd., Kanagawa (JP)

( * ) Notice: Subject to any disclaimer, the term of this patent is extended or adjusted under 35 U.S.C. 154(b) by 0 days.

(21) Appl. No.: 12/970,227

(22) Filed: Dec. 16, 2010

(65) Prior Publication Data

US 2011/0138899 A1 Jun. 16, 2011

(30) Foreign Application Priority Data

Dec. 16, 2009 (JP) .................................. 2009-285041

(51) Int. Cl.
*G01M 17/02* (2006.01)
(52) U.S. Cl. ........................................................ 73/146
(58) Field of Classification Search .................... None
See application file for complete search history.

(56) References Cited

U.S. PATENT DOCUMENTS

| 3,977,243 | A | * | 8/1976 | Yamada et al. | 73/146 |
| 4,160,378 | A | * | 7/1979 | Himmler | 73/146 |
| 5,481,907 | A | * | 1/1996 | Chasco et al. | 73/146 |
| 7,908,916 | B2 | * | 3/2011 | Jenniges et al. | 73/146 |
| 2009/0301183 | A1 | * | 12/2009 | Jenniges et al. | 73/146 |
| 2010/0037686 | A1 | * | 2/2010 | Kitagawa et al. | 73/146 |
| 2011/0000292 | A1 | * | 1/2011 | Yoshikawa et al. | 73/146 |

FOREIGN PATENT DOCUMENTS

| EP | 2 249 138 A1 | 11/2010 |
| JP | 2008-241589 A | 10/2008 |
| JP | 2009-204324 A | 9/2009 |

* cited by examiner

*Primary Examiner* — Andre Allen
(74) *Attorney, Agent, or Firm* — Kenealy Vaidya LLP

(57) ABSTRACT

A tire testing device which can improve reliability in measurement of loss in tire is provided. The tire testing device can include a tire motor connected with the rotational shaft of the tire, a tire shaft torque meter for detecting torque applied to the rotational shaft of the tire, a roller on to which the tire is pressed to be contact with, a roller motor connected with the rotational shaft of the roller, and a roller shaft torque meter for detecting the torque applied to the rotational shaft of the roller. The device measures loss of power in tire from the difference in power of the tire obtained by adding the torque measured by the tire shaft torque meter and the difference in power of the roller obtained by adding the torque measured by the roller shaft torque meter.

20 Claims, 3 Drawing Sheets

TIRE TESTING DEVICE

This application claims the priority benefit under 35 U.S.C. §119 of Japanese Patent Application No. 2009-285041 filed on Dec. 16, 2009, which is hereby incorporated in its entirety by reference.

TECHNICAL FIELD

The present invention relates to a tire testing device used for testing various characteristics of tires.

BACKGROUND ART

One of the known tire testing devices is the apparatus, which has a roller that is rotated by a motor, a spindle rotatably supported with a bearing and a load cell for detecting torque on the spindle and determines rolling resistance of tire based on the torque detected by the load cell, while rotating the tire fixed on the spindle together with the roller, on to the surface of which the tire is pressed to be contact with (see, Patent Document 1: Japanese Patent Unexamined Publication No. 2009-204324).

Another known tire testing devices is the apparatus, which has a first motor that rotates a roller and a second motor that rotates a tire and evaluates adhesiveness of a tread splice part of the tire by rotating the tire pressed on to the roller surface while giving a braking or driving force to the tire by controlling the first and second motors (See, Patent Document 2: Japanese Patent Unexamined Publication No. 2008-241589).

SUMMARY OF THE INVENTION

Problems to be solved by the Invention

The tire testing devices as disclosed in the above-mentioned Patent Document 1 are not able to measure the rolling resistance of the tire that is subject to a given load. Since under the conditions, in which the tire is subject to load, it is not possible to separate the component caused by the rolling resistance from that caused by the load applied to the tire only by a load cell that detects torque applied to the tire spindle, the rolling resistance may not be accurately measured. Under the conditions simulating the running on road, therefore, such tire testing devices may not measure the rolling resistance sufficiently reliably.

Also, loss of work in tire is directly related with the fuel economy and the environmental performance of vehicle, but the above-mentioned tire testing device cannot directly measure the loss of work in tire.

For this reason, there has been no other way so far than to estimate loss from the rolling resistance of tire measured by using such tire testing devices as described in the above-mentioned Patent Document 1, and the loss of work in tire could not be highly reliably calculated.

The object of the present invention, therefore, is to achieve more reliable measurement of the loss of work in tire.

Means for Achieving the Object

In order to achieve the foregoing object, a tire testing device of the present invention, which is to be used for testing tires and has a roller, on which the tire is pressed to be contact with, comprises a tire motor connected with a rotational shaft of the tire, a tire torque detection part for detecting torque applied to the rotational shaft of the tire, a roller motor connected with the rotational shaft of the roller, a roller torque detection part for detecting torque applied to the rotational shaft of the roller, a motor control part for controlling the torque generating by the tire motor and the torque generating by the roller motor and a measurement part for measuring characteristics of the tire, based at least on the torque detected by the tire torque detection part and that by the roller torque detection part.

Since this tire testing device has a tire motor connected with the rotational shaft of tire and a roller motor connected with the rotational shaft of roller, it can perform the test under the condition, in which an arbitrary load is applied to the tire, by controlling the torque generating by these motors.

That is to say, for example, by controlling the torque generating by the roller motor depending on rotational speed of the roller to ensure that load corresponding to the estimated running resistance of a vehicle equipped with the tire while running should be applied to the tire by the motor control part, it will become possible to perform the test while applying load that simulates the running resistance of a actually running vehicle.

Since this tire testing device has the tire torque detection part for detecting torque applied to the rotational shaft of the tire and the roller torque detection part for detecting torque applied to the rotational shaft of the tire, it will become possible to separate the component attributable to loss of tire and the component added to the tire from the roller and to test the characteristics of the tire with high reliability, based on the torque detected at these detection parts, even under the condition, in which a desired load is applied to the tire from the roller.

In other words, in order to measure power lost in tire, such tire testing device can be equipped with a tire tachometer for detecting rotational speed of the tire and a roller tachometer for detecting rotational speed of the roller, in which the measurement part measures the difference between power of the tire, which is obtained by multiplying torque of the tire obtained to include increment/decrement of the torque detected by the tire torque detection part, by angular speed of the tire to be obtained from the rotational speed of the tire detected by the tire tachometer, and power of the roller, which is obtained by multiplying torque of the roller obtained to include increment/decrement of the torque detected by the roller torque detection part by angular speed of the roller to be obtained from rotational speed of the roller detected by the roller revolution indicator, as the power lost in tire.

In such tire testing device, the difference between work of the tire that is obtained by integrating the power of the tire and work of the roller that is obtained by integrating the power of the roller at the measurement part can be measured as work lost in tire.

Also in the above-mentioned tire testing device, in order to measure loss resistance or rolling friction resistance of tire, the difference between force applied to the surface of the tire, which is obtained from the torque of the tire obtained to include increment/decrement of the torque detected by the tire torque detection part and a radius of the tire, and force applied to the surface of the roller, which is obtained from the torque of the roller obtained to include increment/decrement of the torque detected by the roller torque detection part and a radius of the roller can be calculated as the loss resistance or rolling friction resistance of the tire at the measurement part.

Also, in the above-mentioned tire testing device, a rolling friction resistance coefficient of the tire can be calculated at the measurement part by dividing the difference between the force applied to the surface of the tire, which can be obtained from the torque of the tire obtained to include increment/decrement of the torque detected by the tire torque detection part and the radius of the tire, and the force applied to the surface of the roller, which can be obtained from the torque of the roller obtained to include increment/decrement of the torque detected by the roller torque detection part and the radius of the roller, by the load of the tire applied to the roller.

In addition, in all of the above-mentioned tire testing devices, the measurement part may obtain the torque of the tire by adding the torque detected by the tire torque detection part, a parasitic torque of the tire and a rotational inertia torque of the tire that is calculated from angular acceleration of the tire to be obtained from the tire rotational speed detected by the tire tachometer and inertia moment of the tire, and the torque of the roller by adding the torque detected by the roller torque detection part, a parasitic torque of the roller and a rotational inertia torque of the roller that is calculated from angular acceleration of the roller to be obtained from the roller rotational speed detected by the roller tachometer and inertia moment of the roller.

Also, in all of these above-mentioned tire testing devices, the foregoing tire torque detection part can comprise a first shaft torque meter capable of detecting torque in torsion direction to be applied to the rotational shaft of the tire, while the foregoing roller torque detection part can comprise a second shaft torque meter capable of detecting torque in torsion direction to be applied to the rotational shaft of the roller.

EFFECTS OF THE INVENTION

According to the present invention, the loss of work in tire can be measured more reliably.

DETAILED DESCRIPTION OF THE PREFERRED EMBODIMENTS

Figure 1:
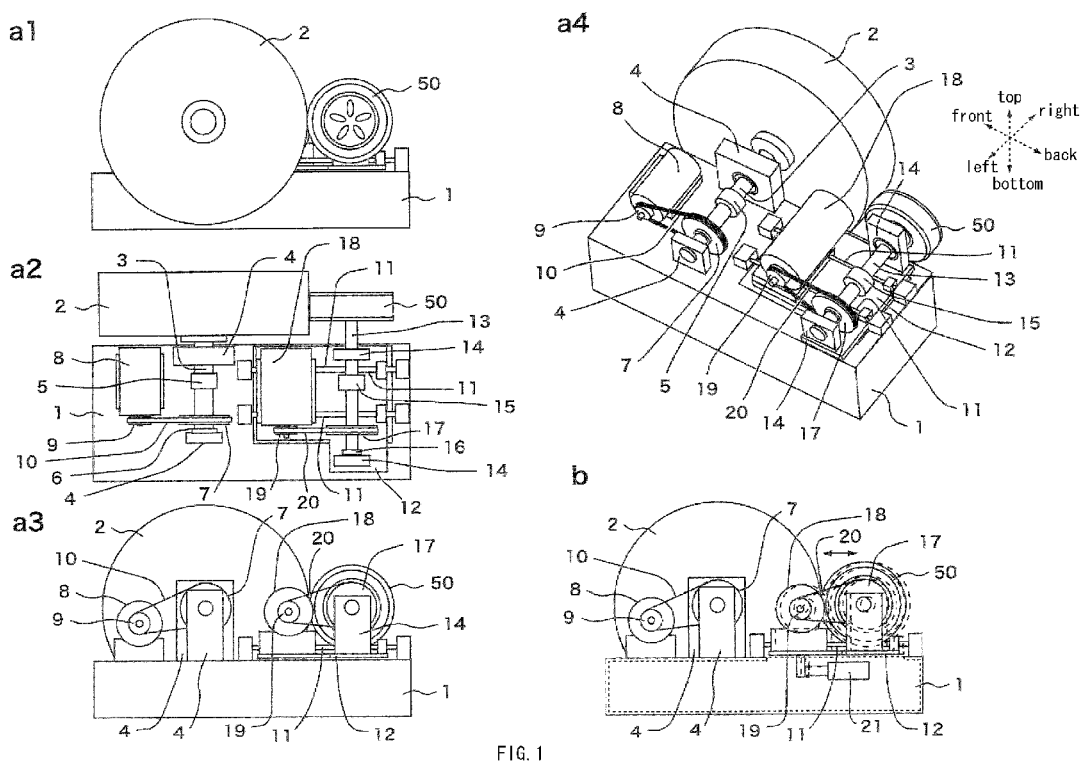
FIG. 1 A diagram showing the configuration of the tire testing device according to one embodiment of the present invention FIG. 2 A block diagram showing the configuration of the control part of the tire testing device according to one embodiment of the present invention FIG. 3 A diagram showing the parameters used in the calculation of tire characteristics according to one embodiment of the present invention

Embodiments of the present invention will be explained below. FIGS. 1, a1-a4 are schematic drawings showing the configuration of a tire testing device according to one embodiment of the present invention.

FIG. 1, a4, is a perspective view showing the tire testing device, where top/bottom, front/back and right/left of the device are defined. Views of the tire testing device from the right, the top and the left are shown in FIG. 1(a1), FIG. 1(a2) and Figure (a3), respectively.

As illustrated, the tire testing device comprises a base 1, a roller 2, a roller shaft 3 connected with the roller 2, a roller shaft bearing 4, which is fixed on the base 1 and supports the roller shaft 3 rotatably, a roller shaft torque meter 5 for detecting torque around the shaft (in torsion direction) applied to the roller shaft 3, a roller tachometer 6 for detecting angular rotational speed of the roller shaft 3, a roller pulley 7 fixed on the roller shaft 3, a roller motor 8 fixed on the base 1 and, a roller belt 10 wound on a roller motor pulley 9 fixed on the rotational shaft of the roller motor Band the roller motor pulley 7. This configuration ensures that the torque generating by the roller motor 8 is transmitted to the roller 2, and the roller 2 is rotated with the rotation of the roller motor 8.

The tire testing device also has a stage 12 which is supported by two guide shafts 11 to allow them to move backward and forward relative to the base 1.

On the stage 12 are mounted a tire shaft 13, at one end of which a tire 50, a subject to be tested, is fixed, a tire shaft bearing 14 which is fixed on the stage 12 and supports the tire shaft 13 rotatably, a tire shaft torque meter 15 for detecting torque around the shaft (in torsion direction) applied to the tire shaft 13, a tire tachometer 16 for detecting angular rotational speed of the tire shaft 13, a tire pulley 17 fixed on the tire shaft 13, a tire motor 18 fixed on the stage 12 and, a tire belt 20a wound around a tire motor pulley 19 fixed on the rotational shaft of the tire motor 18 and the tire pulley 17. This configuration ensures that the torque generating by the tire motor 18 is transmitted to the tire 50, and thereby rotating the tire 50 with the rotation of the tire motor 18.

The tire testing device comprises an actuator 21 inside the base 1, as shown in FIG. 1(b), and by pushing and pulling the lower part of the stage 21 with the actuator 21, the stage 12 can be moved backward and forward relative to the base 1 and the surface of the tire 50 can be pressed to be contact with the surface of the roller 2 with a desired force.

According to such configuration, the tire 50 can be rotated at a desired speed by applying a desired load by controlling the torque generating by the tire motor 18 and the roller motor 8 under the conditions in which the surface of the tire 50 is pressed on to the surface of the roller 2 with a desired force.

Meanwhile, in order to control the roller motor 8 and the tire motor 18, and measure various characteristics of the tire 50, the tire testing device has a control part, though it is not illustrated in FIG. 1.

Figure 2:
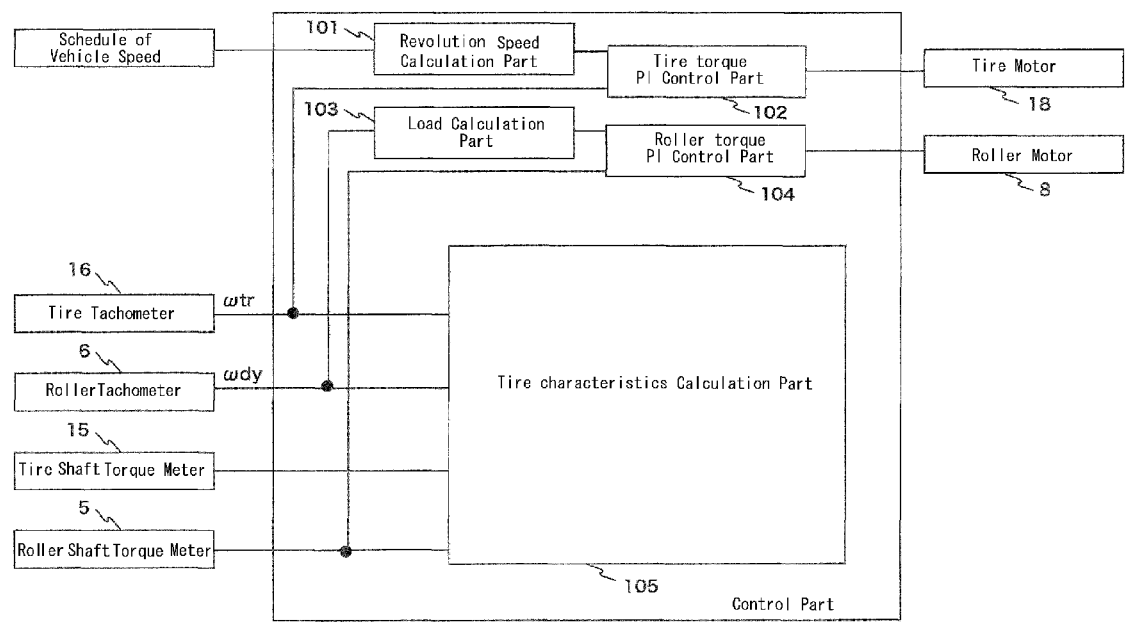

FIG. 2 shows a configuration of this control part.

As shown in FIG. 2, the control part comprises a revolution speed calculation part 101, a tire torque PI control part 102, a load calculation part 103, a roller torque PI control part 104, a tire characteristics calculation part 105.

The revolution speed calculation part 101 obtains a target vehicle speed of present point specified by the schedule of vehicle speed determined in advance at each point and convert the obtained target vehicle speed to the angular speed of the tire 50 and output it as a target angular speed. The tire torque PI control part 102 controls the torque generating by the tire motor 18 by means of PI control or PID control so that there is no deviation between the target angular speed outputted by the revolution speed calculation part 101 and the angular speed, ωtr, of the present tire 50 measured by the tire tachometer 16.

A load calculation part 103 calculates running resistance, including various resistance such as air resistance, of a virtual vehicle assumed as using the tire 50, based on angular speed ωdy and angular acceleration obtained from changes in angular speed ωdy, of the present roller 2 measured with the roller tachometer 6, as a target load. And the roller torque PI control part 104 controls the torque generating by the roller motor 8 by means of PI control or PID control so that the deviation between the target load calculated by the load calculation part 103 and the load applied by the present roller 2 to the tire 50, which is calculated by the torque Tdy detected by the roller shaft torque meter 5, becomes zero. Load, Ra, corresponding to the air resistance of vehicle running at speed V is obtained in the formula below, as "*" means multiplication, $$Ra = (Cd * p/2) * S * V2$$

where, frontal projected area is S, air resistance coefficient is Cd and air density is P for the car assumed to use the tire 50 in this test.

It (Ra) is obtained also by setting the circumferential speed of the roller 2 to be obtained from the angular speed ωdy and the radius of the roller 2 as vehicle speed, V.

Then, the tire characteristics calculation part 105 calculates loss resistance/rolling friction resistance of the tire 50, rolling friction coefficient of the tire 50, lost power of the tire 50 and lost work of the tire 50, as explained below.

Figure 3:
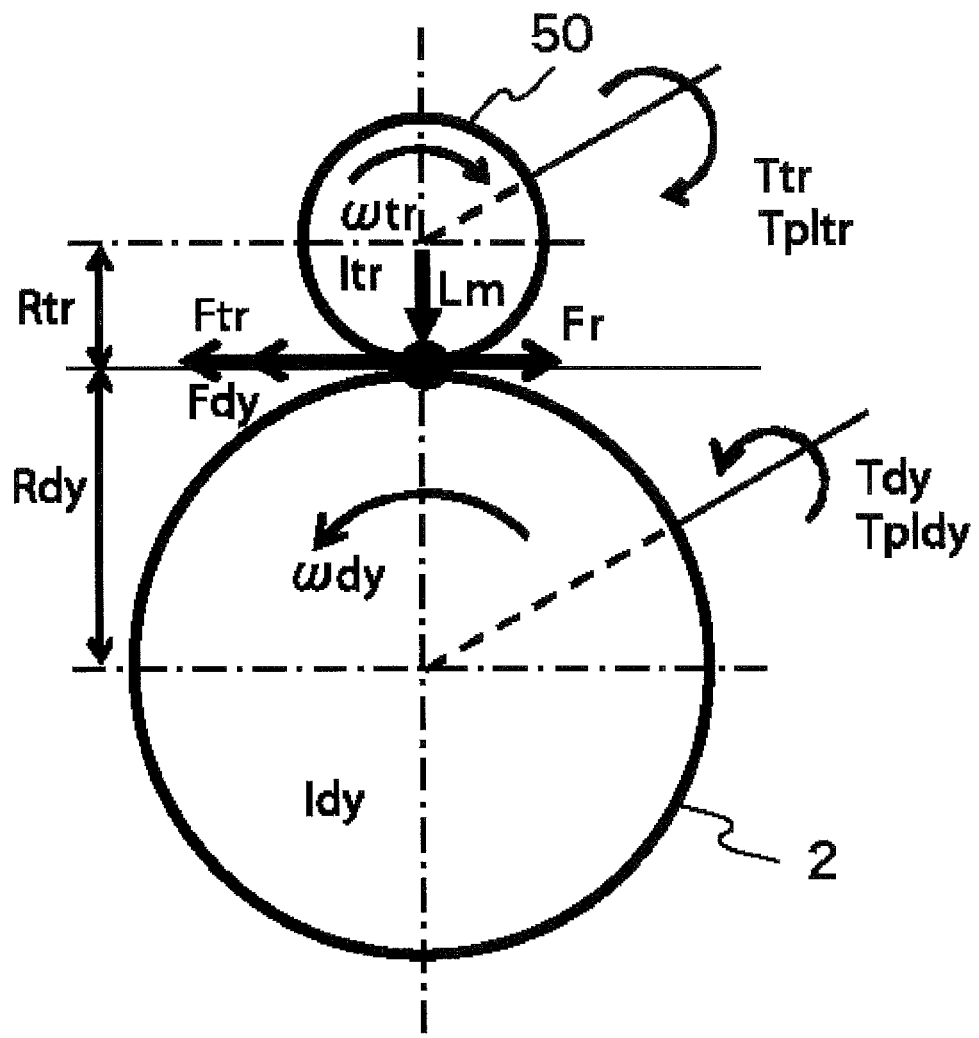

As shown in FIG. 3, the torque applied by the tire 50 to the roller 2 as expressed by the torque detected by the roller shaft torque meter 5 is defined as Tdy, the parasitic torque, which is a latent torque loss immeasurable by the roller shaft torque meter 5, such as rolling resistance of roller bearing and windage loss resistance of roller 2 as Tpldy, the inertia moment of the roller 2 as Idy, the angular speed of the present roller 2 measured by the roller tachometer 6 as ωdy, the angular acceleration obtained by the angular speed ωdy, of the roller 2, as δdy and the radius of the roller 2 as Rdy.

Also, the torque applied by the roller 2 to the tire 50 as expressed by the torque detected by the tire shaft torque meter 15 is defined as Ttr, the parasitic torque, which is a latent torque loss immeasurable by the tire shaft torque meter 15, such as rolling resistance of tire bearing and windage loss of tire 50 as Tpltr, the inertia moment of the tire 50 as Itr, the angular speed of the present tire 50 measures by the tire tachometer 16 as ωtr, the angular acceleration obtained by the angular speed ωtr, of the tire 50 as δtr and the radius of the tire 50 as Rtr.

And the load applied by the tire 50 to the roller 2 which is obtained by the pressing force in the direction of roller 2 on the stage 12 of the actuator 21 is defined as Lm.

In this case, the total torque, Tttldy, of the roller 2 is the sum of torque Tdy, torque Tpldy and rotational inertia torque Idy*δdy of the roller 2, whereas the total torque Tttltr of the tire 50 is the sum of torque Ttr, torque Tpltr and rotational inertia torque Itr*δtr of the tire 50.

Accordingly, the torque of roller 2, Tttldy, can be converted to the force, Fdy, to be applied to the direction of tangent line at the contact point of the roller 2 and the tire 50 as shown below:

$$Fdy=(Tdy+Tpldy+Idy*\delta dy)/Rdy$$

The torque of the tire 50, Tttltr, can be converted to the force, Ftr, to be applied to the direction of tangent line at the contact point of the tire 50 and the roller 2 as shown below:

$$Ftr=(Ttr+Tpltr+Itr*\delta tr)/Rtr$$

Fdy is considered as the force the roller 2 can absorb from the tire 50, and if there is no loss in tire, Fdy and Ftr would be identical. Accordingly, the tire characteristics calculation part 105 obtains the loss resistance/rolling resistance, Fr, of the tire 50 from the following formula:

$$Fr=Ftr-Fdy$$

And, the rolling resistance coefficient of the tire 50, Cr, is obtained from the following formula:

$$Cr=Fr/Lm$$

Then, the power of the roller 2, Pdy, can be obtained as a product of the torque of the roller 2, Tttldy, and the angular speed of the roller 2, ωdy, while the power of the tire 50, Ptr, can be obtained as a product of the torque of the tire 50, Tttltr, and the angular speed of the tire 50, ωtr. Therefore each power can be expressed as follows:

$$Pdy=(Tdy+Tpldy+Idy*\delta dy)*\omega dy$$

$$Ptr=(Ttr+Tpltr+Itr*\delta tr)*\omega tr$$

Pdy can be considered as the power of the work by Fdy, Fdy*Rdy*ωdy, and Ptr as the power of the work by Ftr, Ftr*Rtr*ωtr, so the Pdy and Ptr are expressed with the same formulas as described above.

$$Pdy=(Tdy+Tpldy+Idy*\delta dy)*\omega dy$$

$$Ptr=(Ttr+Tpltr+Itr*\delta tr)*\omega tr$$

Moreover, as Pdy and Ptr are identical unless there is loss of power in tire 50, the tire characteristics calculation part, 105, obtains the loss of power, Pr, of tire 50 with the following formula.

$$Pr=Ptr-Pdy.$$

Since the work of roller 2, Wdy, is obtained as an integral value of power of roller 2, Pdy, while the work of tire 50, Wtr, is obtained as an integral value of power of tire 50, Ptr, both works are expressed with the formulas below:

$$Wdy=\int Pdy$$

$$Wtr=\int Ptr$$

Accordingly, the tire characteristics calculation part 105 obtains the loss of work in tire 50, Wr, with the formula, $$Wr=Wtr-Wdy$$

Above is the explanation of an embodiment of the present invention.

As has been explained, in this embodiment, every loss in the tire 50 can be measured more reliably while applying a load simulating the actual running on road.

Description of Notations

1: Base, 2: Roller, 3: Roller shaft, 4: Roller shaft bearing, 5: Roller shaft torque meter, 6: Roller tachometer, 7: Roller pulley, 8: Roller motor, 9: Roller motor pulley, 10: Roller belt, 11: Guide shaft, 12: Stage, 13: Tire shaft, 14: Tire shaft bearing, 15: Tire shaft torquebeter, 16: Tire tachometer, 17: Tire pulley, 18: Tire motor, 19: Tire motor pulley, 20: Tire belt, 21: Actuator, 50: Tire, 101: Revolution speed calculation part, 102: Tire torque PI control part, 103: Load calculation part, 104: Roller torque PI control part, 105: Tire characteristics calculation part.

The invention claimed is:

1. A tire testing device used for testing tires, comprising a roller on to the surface of which the tire is pressed to be contact with and comprising a tire motor connected with the rotational shaft of the tire, a tire torque detection part for detecting torque applied to the rotational shaft of the tire, a roller motor connected with the rotational shaft of the roller, a roller torque detection part for detecting torque applied to the rotational shaft of the roller, a motor control part for controlling the torque generating by the tire motor and the torque generating by the roller motor, and a measurement part for measuring characteristics of the tire, based on the torque detected by the tire torque detection part and the torque detected by the roller torque detection part.

2. The tire testing device according to claim 1, further comprising a tire tachometer for detecting rotational speed of the tire and a roller tachometer for detecting rotational speed of the roller, wherein the measurement part measures the difference between power of the tire, which is obtained by multiplying a torque of the tire obtained to include increment/decrement of the torque detected by the tire torque detection part, by angular speed of the tire to be obtained from the rotational speed of the tire detected by the tire tachometer, and power of the roller, which is obtained by multiplying a torque of the roller obtained to include increment/decrement of the torque detected by the roller torque detection part by angular speed of the roller to be obtained from rotational speed of the roller detected by the roller tachometer, as power lost in tire.

3. The tire testing device according to claim 2,
wherein the measurement part obtains the torque of the tire by adding the torque detected by the tire torque detection part, a parasitic torque of the tire and a rotational inertia torque of the tire that is calculated from angular acceleration of the tire to be obtained from the tire rotational speed of the tire detected by the tire tachometer and inertia moment of the tire, and
the measurement part obtains the torque of the roller by adding the torque detected by the roller torque detection part, a parasitic torque of the roller and a rotational inertia torque of the roller that is calculated from angular acceleration of the roller to be obtained from the roller rotational speed of the roller detected by the roller tachometer and inertia moment of the roller.

4. The tire testing device according to claim 2,
wherein the measurement part measures the difference between work of the tire obtained by integrating power of the tire and work of the roller obtained by integrating power of the roller as work lost in tire.

5. The tire testing device according to claim 1,
wherein the measurement part calculates the difference between force applied to the surface of the tire, which is obtained from the torque of the tire obtained to include increment/decrement of the torque detected by the tire torque detection part and a radius of the tire, and force applied to the surface of the roller, which is obtained from the torque of the roller obtained to include increment/decrement of the torque detected by the roller torque detection part and a radius of the roller, as loss resistance or rolling friction resistance of the tire.

6. The tire testing device according to claim 1,
wherein the measurement part calculates a rolling friction resistance coefficient of the tire by dividing the difference between force applied to the surface of the tire, which can be obtained from a torque of the tire obtained to include increment/decrement of the torque detected by the tire torque detection part and a radius of the tire, and force applied to the surface of the roller, which can be obtained from a torque of the roller obtained to include increment/decrement of the torque detected by the roller torque detection part and a radius of the roller by load of the tire applied to the roller.

7. The tire testing device according to claim 5, further comprising a tire tachometer detecting rotational speed of the tire, and a roller tachometer detecting rotational speed of the roller,
wherein the measurement part obtains the torque of the tire by adding the torque detected by the tire torque detection part, a parasitic torque of the tire and a rotational inertia torque of the tire that is calculated from angular acceleration of the tire to be obtained from rotational speed of the tire detected by the tire tachometer and inertia moment of the tire, and the measurement part obtains the torque of the roller by adding the torque detected by the roller torque detection part, a parasitic torque of the roller and a rotational inertia torque of the roller that is calculated from angular acceleration of the roller to be obtained from rotational speed of the roller detected by the roller tachometer and inertia moment of the roller.

8. The tire testing device according to claim 1,
wherein the motor control part controls the torque generating by the roller motor depending on the rotational speed of the roller so that running load estimated to be applied to the tire when a vehicle having the tire runs actually is applied to the tire.

9. The tire testing device according to claim 1,
wherein the tire torque detection part comprises a first shaft torque meter for detecting torque in torsion direction applied to the rotational shaft of the tire, and
the roller torque detection part comprises a second shaft torque meter for detecting torque in torsion direction applied to the rotational shaft of the roller.

10. The tire testing device according to claim 3,
wherein the measurement part measures the difference between work of the tire obtained by integrating power of the tire and work of the roller obtained by integrating power of the roller as work lost in tire.

11. The tire testing device according to claim 6, further comprising a tire tachometer detecting rotational speed of the tire, and a roller tachometer detecting rotational speed of the roller,
wherein the measurement part obtains the torque of the tire by adding the torque detected by the tire torque detection part, a parasitic torque of the tire and a rotational inertia torque of the tire that is calculated from angular acceleration of the tire to be obtained from rotational speed of the tire detected by the tire tachometer and inertia moment of the tire, and
the measurement part obtains the torque of the roller by adding the torque detected by the roller torque detection part, a parasitic torque of the roller and a rotational inertia torque of the roller that is calculated from angular acceleration of the roller to be obtained from rotational speed of the roller detected by the roller tachometer and inertia moment of the roller.

12. The tire testing device according to claim 2,
wherein the motor control part controls the torque generating by the roller motor depending on the rotational speed of the roller so that running load estimated to be applied to the tire when a vehicle having the tire runs actually is applied to the tire.

13. The tire testing device according to claim 3,
wherein the motor control part controls the torque generating by the roller motor depending on the rotational speed of the roller so that running load estimated to be applied to the tire when a vehicle having the tire runs actually is applied to the tire.

14. The tire testing device according to claim 4,
wherein the motor control part controls the torque generating by the roller motor depending on the rotational speed of the roller so that running load estimated to be applied to the tire when a vehicle having the tire runs actually is applied to the tire.

15. The tire testing device according to claim 5,
wherein the motor control part controls the torque generating by the roller motor depending on the rotational speed of the roller so that running load estimated to be applied to the tire when a vehicle having the tire runs actually is applied to the tire.

16. The tire testing device according to claim 6,
wherein the motor control part controls the torque generating by the roller motor depending on the rotational speed of the roller so that running load estimated to be applied to the tire when a vehicle having the tire runs actually is applied to the tire.

17. The tire testing device according to claim 2, wherein the tire torque detection part comprises a first shaft torque meter for detecting torque in torsion direction applied to the rotational shaft of the tire, and the roller torque detection part comprises a second shaft torque meter for detecting torque in torsion direction applied to the rotational shaft of the roller.

18. The tire testing device according to claim 3, wherein the tire torque detection part comprises a first shaft torque meter for detecting torque in torsion direction applied to the rotational shaft of the tire, and the roller torque detection part comprises a second shaft torque meter for detecting torque in torsion direction applied to the rotational shaft of the roller.

19. The tire testing device according to claim 4, wherein the tire torque detection part comprises a first shaft torque meter for detecting torque in torsion direction applied to the rotational shaft of the tire, and the roller torque detection part comprises a second shaft torque meter for detecting torque in torsion direction applied to the rotational shaft of the roller.

20. The tire testing device according to claim 5, wherein the tire torque detection part comprises a first shaft torque meter for detecting torque in torsion direction applied to the rotational shaft of the tire, and the roller torque detection part comprises a second shaft torque meter for detecting torque in torsion direction applied to the rotational shaft of the roller.

* * * * *